(12) United States Patent
Wystup et al.

(10) Patent No.: US 11,768,001 B2
(45) Date of Patent: Sep. 26, 2023

(54) VENTILATOR WITH A SENSOR DEVICE TO AVOID A COLLISION BETWEEN AN OBJECT WITH THE ROTOR

(71) Applicant: ebm-papst Mulfingen GmbH & Co. KG, Mulfingen (DE)

(72) Inventors: Ralph Wystup, Künzelsau (DE); Markus Humm, Weißbach (DE); Christian Antonius Knipp, Aspach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 333 days.

(21) Appl. No.: 17/128,852

(22) Filed: Dec. 21, 2020

(65) Prior Publication Data
US 2021/0190352 A1 Jun. 24, 2021

(30) Foreign Application Priority Data
Dec. 20, 2019 (DE) .......................... 102019135412.9

(51) Int. Cl.
| | | |
|---|---|---|
| *F24F 11/32* | (2018.01) | |
| *F24F 11/89* | (2018.01) | |
| *F16D 49/18* | (2006.01) | |
| *F24F 7/007* | (2006.01) | |

(52) U.S. Cl.
CPC .............. *F24F 11/32* (2018.01); *F16D 49/18* (2013.01); *F24F 7/007* (2013.01); *F24F 11/89* (2018.01)

(58) Field of Classification Search
CPC . F24F 11/32; F24F 7/007; F24F 11/89; F16D 49/18; F04D 27/001; F04D 27/004; F04D 27/008; F04D 25/08; F04D 27/007; F04D 29/668; F04D 29/703; F01D 21/00; F01D 21/003; F01D 21/14; F05D 2270/80
See application file for complete search history.

(56) References Cited

U.S. PATENT DOCUMENTS

| | | | | |
|---|---|---|---|---|
| 6,422,814 B1* | 7/2002 | Dickey | ................. | F04D 27/008 416/169 R |
| 2008/0298962 A1* | 12/2008 | Sliwa | ...................... | F03D 80/00 416/223 R |
| 2013/0280033 A1* | 10/2013 | Babbitt | ............... | F04D 15/0066 415/16 |
| 2014/0193248 A1* | 7/2014 | Johnson | ................ | F04D 27/008 415/191 |
| 2018/0073514 A1* | 3/2018 | Zhang | ................... | F04D 25/166 |
| 2018/0171972 A1* | 6/2018 | Merz | .................... | G05B 13/026 |

FOREIGN PATENT DOCUMENTS

| | | |
|---|---|---|
| DE | 102012215451 | 2/2013 |
| DE | 102017008844 | 3/2019 |
| DE | 102018000938 | 8/2019 |

* cited by examiner

*Primary Examiner* — J. Todd Newton
(74) *Attorney, Agent, or Firm* — Miller Canfield (57) ABSTRACT

A ventilator having a rotor is mounted in a rotatable manner around an axis of rotation. The rotor includes a plurality of blade-like rotor blades arranged around the axis of rotation. The ventilator includes a sensor device for detecting an object approaching one of the plurality of rotor blades, and a control device that receives signals from the sensor device. The control device extrapolates a trajectory of the object from a position x and a speed v of the object, and adjusts an angular position or rotational speed n of the rotor to allow the object to continue moving along its trajectory without colliding with one of the plurality of rotor blades.

14 Claims, 4 Drawing Sheets

VENTILATOR WITH A SENSOR DEVICE TO AVOID A COLLISION BETWEEN AN OBJECT WITH THE ROTOR

CROSS-REFERENCE TO RELATED APPLICATIONS

This application claims priority to German patent application 10 2019 135 412.9, filed on Dec. 20, 2019, the disclosure of which is incorporated herein by reference.

TECHNICAL FIELD

The invention relates to a ventilator having a device to avoid a collision between an object with a rotor of the ventilator.

BACKGROUND OF THE INVENTION

Ventilators for room ventilation, air conditioners, PC fans, and the like typically include a protective screen. The protective screen is close-meshed so that vertebrates and in particular humans and human limbs cannot reach the rotor. The protective screen throttles a fluid conveyed by the ventilator, in particular air, at an inlet as well as at an outlet. Due to the throttling, the protective screen reduces the efficiency of the ventilator. The protective screen further causes swirling and turbulences in the fluid, which can cause disruptive noise emissions. For safety reasons, fans, for example fans in a passenger car or a PC, also generally include a protective screen even when they may be difficult to access.

SUMMARY OF THE INVENTION

The present invention is directed to a ventilator that prevents objects from colliding with a rotor in the ventilator without the use of an axial protective screen.

This object of the invention is solved by means of the independent claims. The subclaims represent further advantageous embodiments. The subclaims can be combined with one another in any technologically sensible manner. The description, in particular in connection with the exemplary embodiments, additionally characterizes and specifies the invention.

The present invention provides a ventilator having a rotor which is mounted in a rotatable manner around an axis of rotation. The rotor includes blade-like rotor blades. The ventilator includes:
  a sensor device for detecting an object approaching one of the rotor blades,
  a control device, which is connected in a signal-transmitting manner to the sensor device and to the ventilator, where the control device extrapolates a trajectory of the object from a position and a speed of the object,
  and where the control device adjusts an angular position or rotational speed of the rotor in such a way that the object can continue to move along its trajectory without colliding with one of the rotor blades.

The rotor can be a rotor for a ventilator. As stated above, the ventilator can be a ventilator for room ventilation, PC ventilation, or similar ventilators. The ventilator can be a turbine which drives a generator, in which case the rotor with the rotor blades is a turbine wheel, an electro mechanical transducer is the generator, and the rotor is a turbine. The electro mechanical transducer can also be an electric motor which drives the rotor as a fan.

The sensor device can accurately detect an object approaching the rotor blade based on its current position, speed, and acceleration. The sensor device also may convert optical and/or acoustical signals into machine-readable analog or digital signals, which can be detected by the control device. The sensor device can detect the object independently of ambient conditions, such as darkness and fog.

The control device may include a microprocessor and memory, and a program may be stored on the memory. The control device detects the data collected by the sensor and uses the program to evaluate the data. The program calculates the position, speed, and acceleration of the object from the data, and correlates them with the current and future positions of the rotor. When the trajectory of the object remains constant, the control device is able to determine when and with which rotor blade a collision will take place if the speed of the rotor remains the same. In the case of an imminent collision, a signal-related, optical, or acoustic warning signal may be output.

The control device also can determine if the object will pass between the rotor blades, thus avoiding a collision. The system will unlikely react in this case. In another scenario, a collision can be prevented by accelerating the rotor. In this case, the control device prompts the electro mechanical transducer (the electric motor) to accelerate the rotor. However, acceleration of the rotor to avoid a collision preferably only occurs when a collision cannot be avoided by decelerating the rotor, for example in the case of very fast objects, such as birds and bats. In a further case, the control device recognizes that a collision can only be avoided by stopping the rotor. In that case, the control device will stop the rotor.

In one embodiment, the rotor can be decelerated via a braking device. The braking device can be embodied to slow the rotor down to a halt within less than two rotations of the rotor. The rotor is preferably decelerated before an object can enter into a protective region around the rotor.

The braking device can be separate or it can be integrated into the electro mechanical transducer. The braking device decelerates the rotor so quickly that the rotor stops before the object reaches its vicinity. For this purpose, the braking device can decelerate the rotor to varying degrees based on the time remaining before a collision.

In one embodiment, the braking device includes an annular surface arranged at an outer circumference of the rotor and a brake shoe cooperating therewith. The inner circumference of the annular surface is adjacent to the rotor blades. In case of an abrupt braking of the rotor blades, forces act on the rotor blades against the direction of rotation while the inertia of the rotor and rotor blades is in the direction of rotation. The outer circumferential annular surface supports the annular surface of the rotor blades, so that the forces cannot lead to an overloading of the rotor blades. The actuator and the brake shoe can be arranged at a massive wall ring which surrounds the rotor. The actuator can be electro mechanical and can actuate the brake shoe via an electrically controllable magnet. In one alternative, the actuator can also have a spring which biases the brake shoe in the closing or braking position during operation of the ventilator so that the brake shoe is applied to the annular surface by means of the spring in the event of a failure of the actuator to decelerate the rotor. In one embodiment, the annular surface is aligned with an outer circumference of the rotor blades. In other embodiments, the annular surface is arranged farther on the inside or farther on the outside in the radial direction with respect to the rotor blades.

In a further embodiment, the ventilator includes a pyrotechnically inflatable catch cushion, which has a slow-down effect and which is deployed before the rotor blade collides with the object to stop the rotor blade.

With larger fans, the pyrotechnically inflatable catch cushion, also referred to as an airbag, can be arranged at the rotor blades. With smaller rotors, the catch cushion can be arranged at a frame which supports the rotor. The catch cushion can engage between the rotor blades or can be arranged on the outer circumference so that the rotor blades strike against the catch cushion after the catch cushion is inflated, thus stopping the rotor blades. For torque support, that is, to prevent a breakdown torque acting on the rotor, two pyrotechnically inflatable catch cushions can be arranged offset from one another by 180°. The catch cushion preferably stops the rotor in less than 100 milliseconds, in particular less than 50 milliseconds, and particularly preferably less than 20 milliseconds. These specified times within which the catch cushion stops the rotor includes the time from triggering the pyrotechnical propelling charge until the rotor stops rotating.

In an alternative or additional embodiment, the ventilator has an outer circumferential pyrotechnically inflatable catch cushion that extends around the ventilator, in particular around one half of the ventilator, after inflation.

The outer circumferential pyrotechnically inflatable catch cushion may inflate around the ventilator hemispherically.

The outer circumferential pyrotechnically inflatable catch cushion that inflates around the ventilator can protect a surrounding area of the ventilator against flying parts when, for example, the rotor is slowed down so abruptly that its inertia leads to a mechanical destruction of the rotor.

The mechanical destruction can occur in particular when, according to a further embodiment, the ventilator has a mechanical stopping device which enters into a trajectory of the rotor blades, abruptly bringing the rotor to a halt and mechanically overloading the rotor blades. In this embodiment, the mechanical stopping device is actuated to avoid a collision.

In one embodiment, the stopping device can be formed by a stopping element which can be moved into a trajectory of the rotor blades via a corresponding actuator, which will likely cause damage to the rotor blades. The stopping element can be moved into the trajectory of the rotor blades in an angular position. In one embodiment, several stopping devices are distributed on the circumference of the rotor. In a further embodiment, the stopping devices are distributed evenly around the circumference of the rotor. In a further embodiment, the number of stopping devices corresponds to the number of rotor blades arranged on the rotor. In this case, the stopping device corresponding to the rotor blade that is expected to collide with the object can be activated in a very short time exactly when the object is expected to collide with the rotor blade, thus mechanically stopping the target rotor blade.

The actuator of the stopping device can be arranged at a massive wall ring which surrounds the rotor. The actuator can be electro mechanical and can actuate the stopping device via an electrically controllable magnet. In an alternative embodiment, the actuator can also have a spring, which is biased in the direction of the stopping position during operation of the ventilator, so that the stopping device is moved into the trajectory of the rotors by means of the spring in the event of a failure of the actuator or of the control device, respectively.

In one embodiment, the ventilator further has an axially covering pyrotechnically inflatable catch cushion, which forms a barrier between the object and the rotor, in order to prevent a collision between the object and the rotor.

The barrier fulfills two functions. On the one hand, it protects the surrounding area against flying parts. On the other hand, it completely prevents the object from entering the region of the rotor.

In one embodiment, the control device short-circuits conductor windings of a stator and/or electric rotor of the electro mechanical transducer in order to decelerate the rotor.

Depending on the construction of the electro mechanical transducer, either the electric rotor or the stator or both are alternatingly supplied with current in order to generate electricity or in order to provide mechanical drive power. The electro mechanical transducer can be a brushless direct current motor, in which case the stator is alternatingly energized in order to drive the rotor. When the stator is short-circuited, an induction in the stator has a braking effect on the rotor. However, the braking power, which can be attained in this way, is not as high as, for example, a braking power which can be generated by the braking device. The braking power, which can be attained by a separate brake, can be selected to be higher. In one embodiment, the stator is therefore initially short-circuited in response to small required delays of the rotor, for example when the object is still sufficiently far away. When the rotor is unexpectedly still not decelerating fast enough, the brake is additionally activated. When the brake also does not decelerate the rotor quickly enough, one of the pyrotechnically inflatable air cushions can be deployed. In the alternative or in addition, the above-described stopping device can additionally stop the rotor or individual rotor blades.

In one embodiment, the control device instructs the electro mechanical transducer to increase its rotational speed so that instead of the object colliding with a rotor blade, it passes through the rotor between two adjacent rotor blades.

This embodiment can be productive, for example, when the object is a bird, which, compared to the rotor, is so fast that the rotor could not be brought to a halt quickly enough. Instead of decelerating the rotor, an acceleration as described could be productive to avoid collision in this case. In the case of a driven ventilator, the increase of the rotational speed can take place by means of an increase of an electrical drive power. In the case of a driving ventilator, which is used as a turbine, the increase of rotational speed can be attained by decreasing (braking) the generator power.

In one embodiment, the sensor device has two sensors, where a first sensor detects a first measured variable, and where a second sensor detects a second measured variable which differs from the first measured variable. The first and second sensor may be selected from a non-exhaustive list, including: an infrared sensor, an infrared camera, an ultrasonic sensor, a lidar sensor, a radar sensor, and/or a camera operating under visible light.

With two sensors, the sensor device can validate the signals received from the sensors. In addition, having two sensors can increase the accuracy of detecting the object. Backup sensors may also be provided for the first and second sensors in case one of the sensors fails.

In at least one embodiment, the invention is directed to a method for a ventilator having a rotor with rotor blades, an electro mechanical transducer connected in a rotationally fixed manner to the rotor, and a sensor device, where the method includes the following steps:

detecting an object approaching the rotor blade via the sensor device, extrapolating a trajectory of the object from a position and a speed relative to the ventilator and the rotor blades considering an angular position and rotational speed of the rotor, adjusting the rotor speed such that the object can continue to move along the trajectory without colliding with one of the rotor blades.

The rotor speed may be adjusted via an actuator, which actuates a brake shoe that acts on an annular surface arranged at the outer circumference of the rotor in order to decelerate the rotor. For this purpose, the control device is connected in a signal-transmitting manner to the actuator.

As mentioned above, the rotor speed may be adjusted by unfolding a pyrotechnically inflatable catch cushion, which has a slow-down effect and stops the rotor. The catch cushion preferably unfolds so that the rotor can be stopped in less than 100 milliseconds, in particular less than 50 milliseconds, and particularly preferably less than 30 milliseconds.

The present invention also is directed to a computer program product that includes program code stored on a computer-readable data carrier to carry out a process embodied as described above when the computer program product is executed on a computer, in particular on a control device for a ventilator.

For this purpose, the computer program can have encoded instructions which carry out the process when the computer program is executed on a computer, in particular a computer in a control device disclosed herein.

In terms of hardware and/or software, the process for detecting objects and for stopping or accelerating, respectively, a rotor in order to avoid a collision with an object, can be formed in a control device. The control device can include a digital processing unit, in particular a microprocessor unit (CPU), which is preferably data- or signal-connected, respectively, to a storage and/or bus system, and/or one or several programs or program modules. The CPU can be formed to process commands, which are implemented as a program stored in a storage system, to detect input signals from a data bus and/or to output signals to a data bus. A storage system can have one or several different storage media, in particular optical, magnetic solid bodies, and/or other non-volatile media. The program can be designed such that it represents or is able to carry out the processes described herein, respectively, so that the CPU can perform the steps of processes of this type, and can thus control, in particular regulate, the actuators for the brake and the stopping device, the pyrotechnically inflatable catch cushions, and the electro mechanical transducer.

BRIEF DESCRIPTION OF THE DRAWINGS

Further details and advantages of the invention become clear on the basis of the exemplary embodiments, which are illustrated in the drawings, in which.

DETAILED DESCRIPTION OF EXAMPLE EMBODIMENTS

The nature of the following description is only illustrative. For the sake of clarity, the same reference numerals are used in the drawings in order to identify similar elements. The devices illustrated in FIGS. 2 to 6 can be provided individually or in combination with a ventilator according to claim 1. For the sake of clarity, they are illustrated separately from one another.

Figure 1:
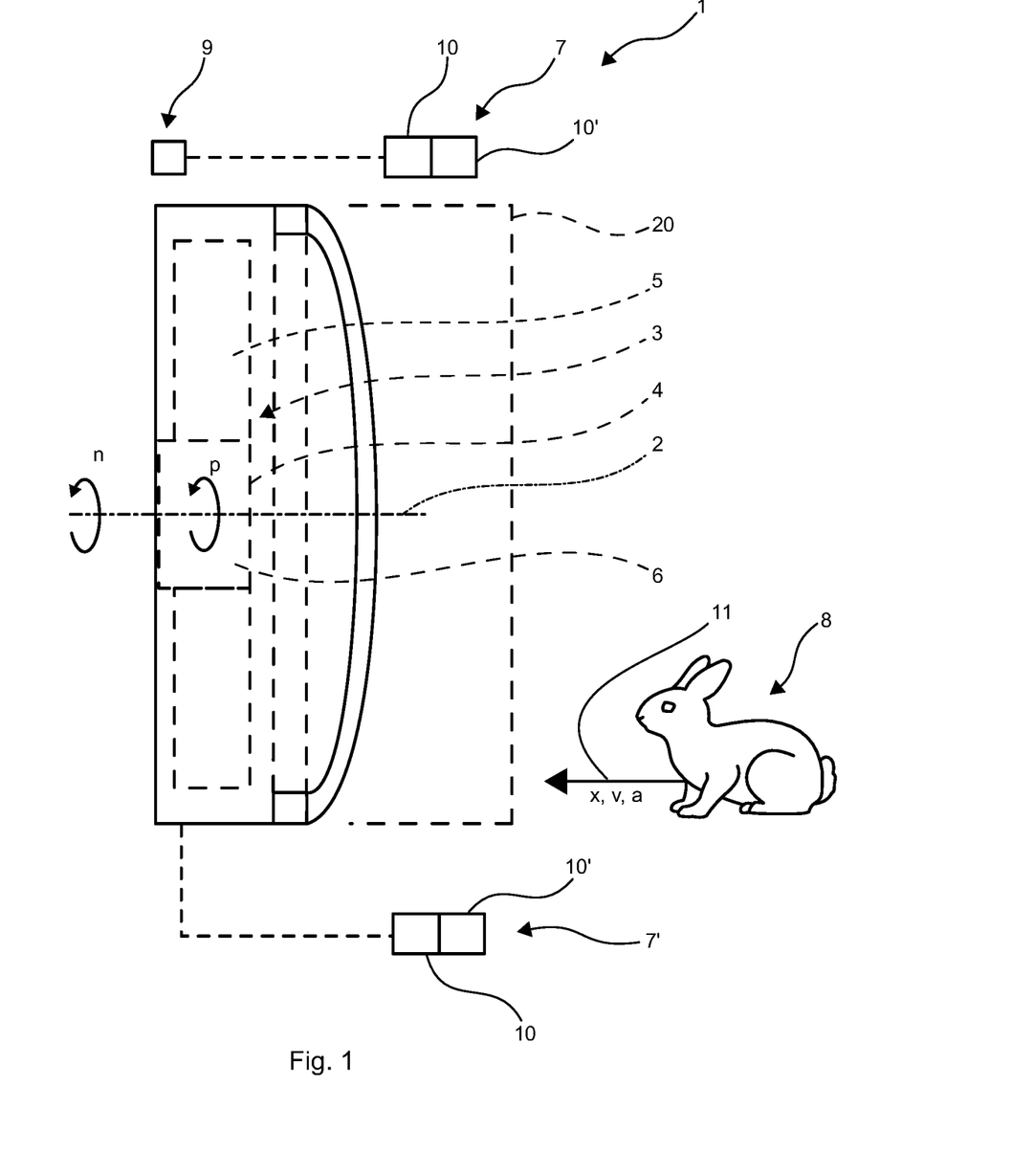
FIG. 1 schematically shows a ventilator comprising a control device and a sensor device.

FIG. 1 shows a ventilator 1 having a rotor 3 which is mounted in a rotatable manner around an axis of rotation 2. Rotor blades 5 extend from a hub 4 at the rotor 3. An electro mechanical transducer 6, which is connected in a rotationally fixed manner to the rotor 3, can be arranged in the hub 4.

Figure 2:
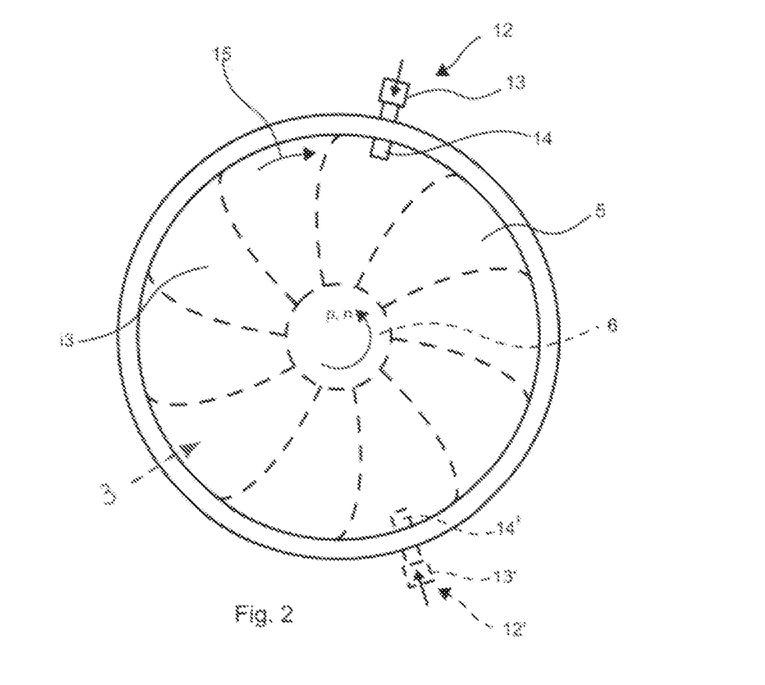
FIG. 2 schematically shows a ventilator comprising a stopping device.

A sensor device 7, 7' for detecting an object 8 which may be present is arranged close to the ventilator 1, possibly connected to the ventilator 1 or in a higher-level, non-illustrated unit. The sensor device 7 detects the object 8. The sensor device 7 detects a position x of the object 8 and generates a signal therefrom, which can be evaluated by a control device 9. The control device 9 is connected in a signal-transmitting manner to the sensor devices 7, 7' and to the ventilator 1. Two sensor device 7, 7' can be provided, as illustrated in FIG. 2, in order to be able to calculate a larger region around the ventilator 1. The sensor device 7, 7' can have sensors 10, 10' for detecting the object 8.

A computer program, which is able to calculate a speed v and an acceleration a of the object 8 from a temporal change of a position x of the object 8, and to at least temporarily store this for processing purposes, runs in the control device 9 during operation of the ventilator 1. The control device 9 can calculate a trajectory 11 of the object 8 from the position x, the speed v, and the acceleration a of the object 8. The trajectory 11 thus reflects a position x of the object 8 in the next few seconds. An angular position p and a rotational speed n of the rotor 3 is further known to the control device 9. From the trajectory 11 of the object 8 and from the angular position p and rotational speed n, with the knowledge of a geometry of the rotor 3 as well as a number and angular position of individual rotor blades 5, the control device 9 can now recognize whether the trajectory 11 of the object 8 intersects a trajectory of the rotor blades 5. If the trajectories of the rotor blades 5 and of the object 11 intersect, a collision could be imminent. The control device 9 adjusts the rotational speed n of the rotor 3 to prevent a collision. The rotational speed n may be adjusted, for example, by means of additional components or by means of a corresponding control of the electro mechanical transducer 6. All of the embodiments discussed in connection with FIGS. 2 to 6 can be applied individually or in combination with ventilator 1 according to FIG. 1.

The rotational speed n adjustment may accelerate the rotor 3, thus increasing the rotational speed n, when a speed v and acceleration of the object 8 is high enough to be able to pass between two rotor blades 5 without making contact with the blades 5. Contrary to the exemplary illustration, the object 8 can also be a very fast bird, the electro mechanical transducer 6 can be a generator, and the rotor 3 can be a turbine. The rotor 3 can also be stopped by short-circuiting a non-illustrated stator winding provided in the electro mechanical transducer 6 so that self-induced currents can generate a magnetic field, which has a slow-down effect. The stator can also be controlled by generating a torque, which decelerates the rotor 3.

As illustrated in an exemplary and schematic manner in FIG. 2, the adjustment of the rotational speed n can also take place via a stopping device 12, 12'. As shown in the exemplary embodiment, two stopping device 12, 12' are provided. Alternatively, the number of stopping devices 12, 12' may correspond to the number of rotor blades 5. The stopping device 12, 12' has an actuator 13 and a stopping element 14. The stopping element 14 can be a plastic block or the like. When the actuator 13 is triggered, the stopping element 14 enters into a trajectory 15 of the rotor blades 5 and prevents them directly from continuing to rotate. Due to the abrupt stop, the rotor blades 5 may be damaged as a result of an inertia i3 of the rotor 3. So that flying shards do not lead to injuries to the object 8 or other non-illustrated objects, an airbag, which completely surrounds the ventilator 1, can simultaneously be deployed when the stopping device 12, 12' is triggered, as illustrated in FIG. 6.

Figure 6:
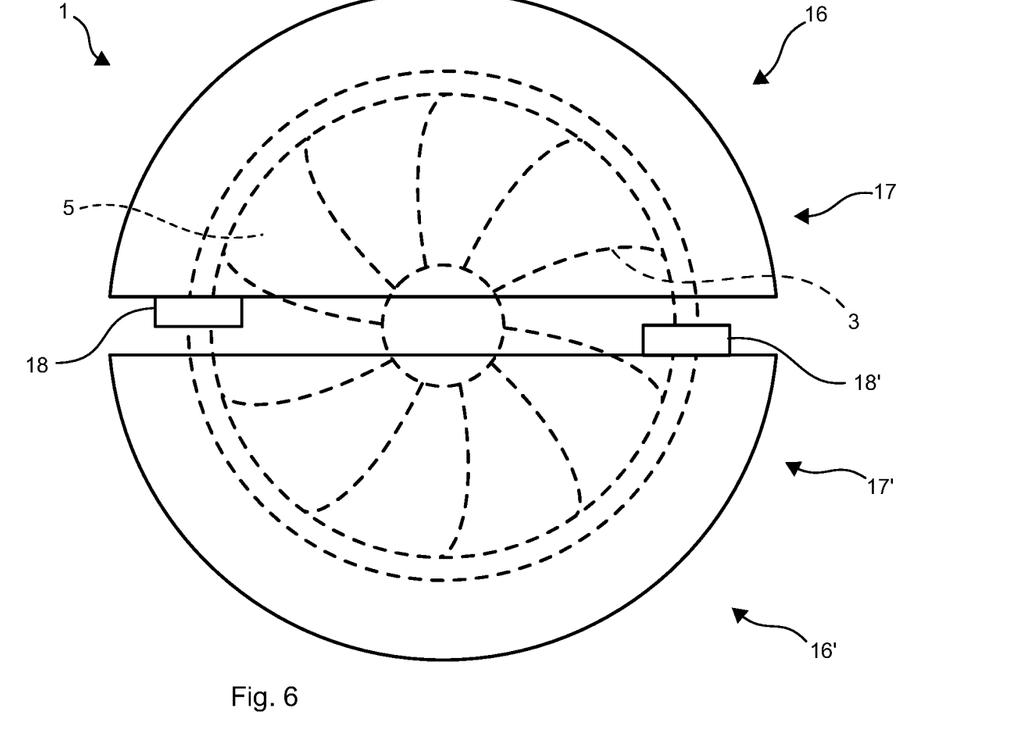
FIG. 6 schematically shows a ventilator comprising an outer circumferential pyrotechnically inflatable catch cushion, which protects a surrounding area against flying parts.

As mentioned, FIG. 6 shows a ventilator 1 comprising an airbag or an outer circumferential pyrotechnically inflatable catch cushion 16, respectively, which is formed such that it extends around the ventilator 1 or the rotor 3, respectively, when inflated. The pyrotechnically inflatable catch cushion 16 can in particular be hemispherical. In the exemplary embodiment shown in FIG. 6, an outer circumferential pyrotechnically inflatable catch cushion 16, 16' is in each case arranged around one half 17, 17' of the ventilator 1. In an operational position, the outer circumferential catch cushions 16, 16' are arranged in airbag modules 18, 18'. The outer circumferentially pyrotechnically inflatable catch cushion 16 is deployed when damage to the rotor 3 is expected, when damage has occurred to the rotor 3, or when an object approaches close to the rotor. The airbag modules 18, 18' receive a signal transmitted from the control device 9 to trigger a pyrotechnical or any other suitable propellant charge and deploy the catch cushion 16 when the control device 9 determines an imminent collision between the object 8 and the rotor 3 and/or when the control device 9 determines that the rotor 3 will be damaged by the stopping device 12 (see FIG. 2).

The pyrotechnically inflatable catch cushion 16, 16' illustrated in FIG. 6 is one of three alternatives disclosed herein. A further alternative is stretched over the rotor 3 like a curtain, according to FIG. 5. A further alternative engages with a trajectory 15 of the rotor blades 5, similar to the stopping device 12, 12' to stop the rotor 3.

Figure 3:
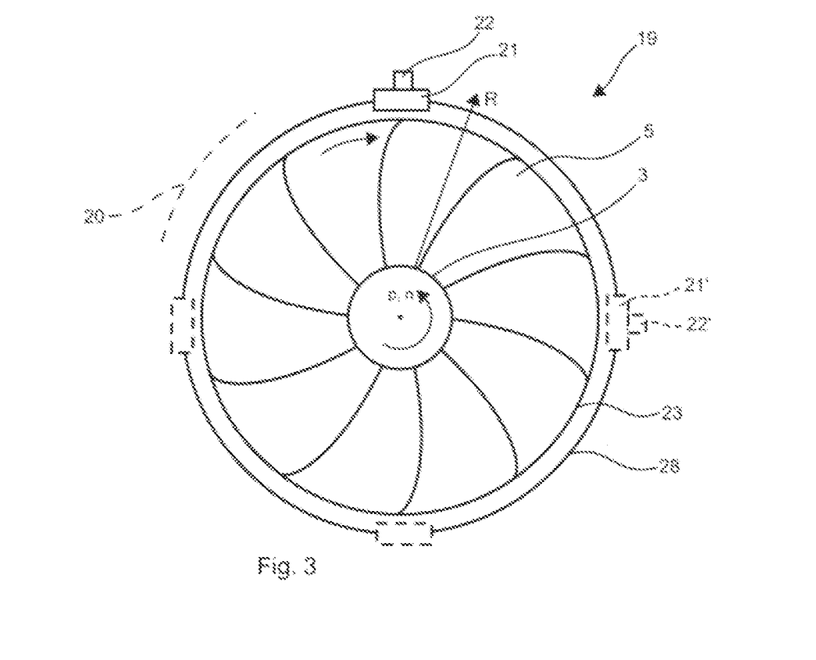
FIG. 3 schematically shows a ventilator comprising a braking device.

According to the exemplary embodiment illustrated in FIG. 3, the rotor 3 can be stopped by means of a braking device 19. For this purpose, the braking device 19 decelerates the rotor 3 to stop it in a short time or in a very short time. This takes place in particular before an object can enter into a protective region 20 around the rotor 3. For this purpose, the braking device 19 may include a brake shoe 21, which can be moved inwards via an actuator 22 opposite a radial direction R. The actuator 22 and the brake shoe 21 are fastened to a massive wall ring 28, which surrounds the rotor 3. The brake shoe 21 then frictionally engages an annular surface 23 arranged at the outer circumference of the rotor 3 to decelerate the rotor 3. As illustrated in FIG. 3, several brake shoes 21,21' and actuators 22,22' can be arranged so as to be evenly distributed around the circumference. The braking device 19 can be actuated in order to stop the rotor 3 when stopping the electro mechanical transducer 6 by short-circuiting the stator winding or other mitigating measures does not stop the rotor 3 before the object collides with the rotor blade.

Figure 4:
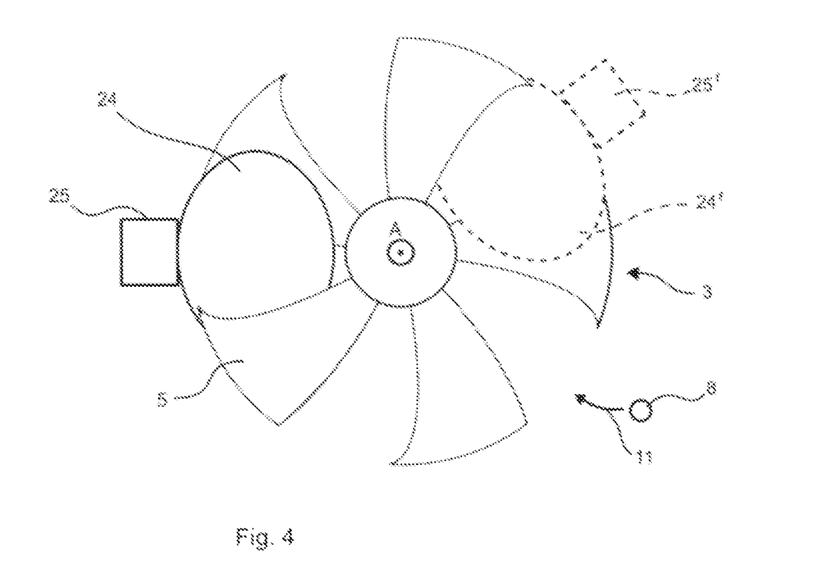
FIG. 4 schematically shows a ventilator comprising a pyrotechnically inflatable catch cushion, which has a slow-down effect and which stops the rotor.

As already described above in connection with the hemispherically inflatable pyrotechnical catch cushion that protects the surrounding area against flying parts, the ventilator according to the exemplary embodiment illustrated in FIG. 4 includes a pyrotechnically inflatable catch cushion 24 which has a slow-down effect and can be deployed before an imminent collision of a rotor blade 5 with the object 8 to stop the rotor blade 5 in less than 100 milliseconds, in particular less than 50 milliseconds, and particularly preferably less than 30 milliseconds. The pyrotechnically inflatable catch cushion 24 is arranged in an airbag module 25 in an appropriate position on the ventilator 1. The airbag module 25 is arranged at a massive, that is, a mechanically durable wall ring 28 (see FIG. 3). Several pyrotechnically inflatable catch cushions 24, 24' can be arranged so as to be distributed around the circumference of the rotor 3. The pyrotechnically inflatable cushion or cushions 24, 24' can be deployed when the braking device 19 is unable to stop the rotor 3 in due time before a collision between the object 8 and the rotor 3. The pyrotechnically inflatable catch cushions 24, 24' are arranged in airbag modules 25, 25' at the wall ring 28 in an appropriate operational position of the ventilator. The airbag modules 25, 25' are connected in a signal-transmitting manner to the control device 9 (see FIG. 1). If the control device 9 detects a collision of the object 8 with the rotor 3 or individual rotor blades 5 and an alternative slow-down embodiment would not bring the rotor 3 to a halt in due time before the collision, the control device 9 transmits a signal to the airbag modules 25, 25' to trigger the pyrotechnically inflatable catch cushions 24, 24'. The catch cushions 24, 24' also extend so far away from the rotor 3 in the axial direction A (away from an image plane in FIG. 4) that an object 8 (animals or a body part, respectively) cannot get into the vicinity of the rotor 3.

To attain an even slow-down, for torque support and/or to prevent a breakdown torque acting on the rotor 3, two or more pyrotechnically inflatable catch cushions 24, 24', stopping devices 12, 12', or brake shoes 21, 21', can be arranged offset from one another.

Figure 5:
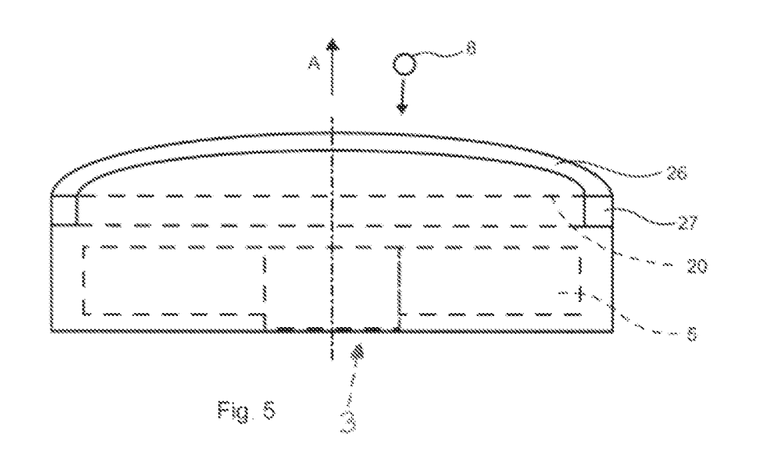
FIG. 5 schematically shows a ventilator comprising an axially covering pyrotechnically inflatable catch cushion, which axially covers the rotor.

FIG. 5 shows a further alternative of a pyrotechnically inflatable catch cushion 26, which stretches over the rotor 3 after deployment, thus forming a barrier between the object 8 and the rotor 3 before the object 8 can get into the protective region 20 opposite to an axial direction A. What is shown is an axially covering pyrotechnically inflatable catch cushion 26. The axially covering, pyrotechnically inflatable catch cushion 26 is arranged in an airbag module 27 in an appropriate operational position of the ventilator 1. The airbag module 27 is connected in a signal-transmitting manner to the control device 9 (see FIG. 1). If the control device 9 detects a collision between the object 8 and the rotor 3 or individual rotor blades 5 and when alternative slow-down embodiments would not bring the rotor 3 to a halt in due time before a collision, the control device 9 triggers the pyrotechnically inflatable catch cushion 26 so that a barrier is formed between the object 8 and the rotor 3.

As described above, the ventilator 1 can have two sensor devices 7, 7', each comprising two sensors 10, 10'. A first sensor 10 can detect a first measured variable, for example electromagnetic waves. A second sensor 10' can detect a second measured variable which differs from the first measured variable, for example electromagnetic waves in a different frequency range, or a completely different measured variable, for example ultrasonic waves. The sensors can be selected from a non-exhaustive list including: an infrared sensor, an infrared camera, an ultrasonic sensor, a lidar sensor, a radar sensor, and/or a camera operating under visible light.

Figure 7:
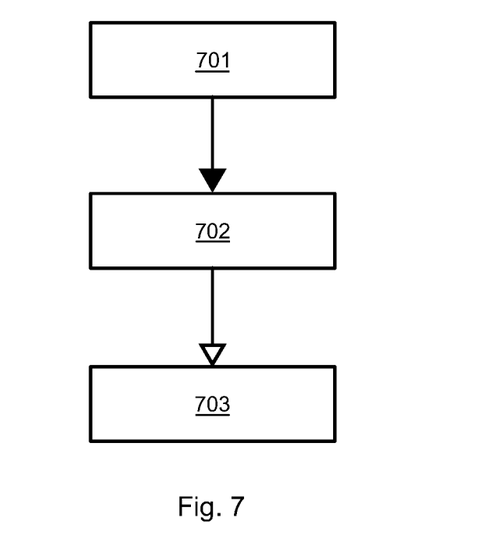
FIG. 7 schematically shows three process steps, which can run in the control device in order to control the ventilator.

Referring to FIGS. 1 and 7, the present invention is also directed to a process for controlling or regulating the ventilator 1. In a first step 701, the sensor device 7 detects an object 8 (see FIG. 1). The object 8 does not need to be a rabbit, as illustrated. Any, in particular, living objects, can be detected. After the detection of an object 8 approaching the rotor blade 3, in step 702 the process extrapolates a trajectory 11 of the object 8 using a position x and a speed v of the object 8 relative to the ventilator 1 and determines if the object 8 is on a collision course with the rotor blades 5, taking into consideration an angular position p and rotational speed n of the rotor 3. The sensor devices 7, 7' detects a position x of the object 8 at several points in time. A speed v and an acceleration a can be calculated from the positions x at several points in time. A trajectory 11 resulting at constant speed v and acceleration can be calculated from these values. The trajectory 11 provides information about future positions x of the object 8. The future position x of the object 8 and also its extension around the position x is considered in the extrapolation. Subsequently, in step 703, the rotor speed n is adjusted so that the object 8 can continue to move along the trajectory 11 without colliding with one of the rotor blades 5.

Several possible process sequences and time periods, in which different protective measures can be activated, will be described below in an exemplary manner. They shall in no way be presumed to be limiting, because the specified time periods are strongly dependent on the inertia i3 of the rotor 3.

In case there is a very long time period (1 to 10 seconds) remaining before the collision, the rotor speed n may be adjusted by turning-off the rotor 3. In case there is a long time period (1 to 5 seconds) remaining before the collision, the rotor speed n may be reduced by short-circuiting a stator winding. Otherwise, if the rotor 3 cannot be electro mechanically slowed down in due time (0.1 to 2 seconds), a braking device 19 may be used to reduce the rotor speed n (see FIG. 3).

In case the braking device 19 cannot bring the rotor 3 to a halt before a collision with the object, a stopping device 12 can abruptly bring the rotor 3 to a halt, which may result in damage to the rotor blades 5. Alternatively, or in addition to the use of the stopping device 12 to halt the rotor blades, the rotor speed n can be reduced by the deployment of three different, yet combinable, pyrotechnically inflatable catch cushions 16, 24, 26. A catch cushion 24 not only decelerates and stops the rotor blades, but it also extends so far in the axial direction A and opposite to an axial direction A that it prevents the object 8 from engaging with the rotor 3.

As discussed above, in case the braking device 19 is unable to stop the rotor 3 before it collides with the object, a stopping device 12 can be used to abruptly bring the rotor 3 to a halt, which will likely damage the rotor blades 5. In case there is damage to the rotor blades 5, the surrounding area can be protected against flying parts by deploying a catch cushion 16 arranged at an outer circumference, as shown in FIG. 6. This is the preferred embodiment when the ventilator 1 does not have an outer circumferential annular surface 23 or when this annular surface 23 is likewise destroyed.

If the stopping device 12 is used to reduce the rotor speed, the surrounding area can be protected from flying parts when a catch cushion 26 is deployed to axially cover the rotor 3, as shown in FIG. 5. This is preferred when the ventilator 1 does not have an outer circumferential cage.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

LIST OF REFERENCE NUMERALS

1 Ventilator
2 axis of rotation
3 Rotor
4 Hub
5 rotor blades
6 electro mechanical transducer
7, 7' sensor device
8 Object
9 control device
10 first sensor
10' second sensor
11 Trajectory
12, 12' stopping device
13, 13' Actuator
14 stopping element
15 Trajectory
16, 16' catch cushion
17, 17' Half
18, 18' airbag module
19 braking device
20 protective region
21, 21' brake shoe
22, 22' Actuator
23 annular surface
24 catch cushion
25 airbag module
26 catch cushion
27 airbag module
28 wall ring
A acceleration
A axial direction
P angle
V speed
X position

The invention claimed is:

1. A ventilator having a rotor operatively connected to an electro mechanical transducer, wherein the rotor is rotatably mounted around an axis of rotation, wherein the rotor includes a plurality of rotor blades arranged around the axis of rotation, the ventilator comprising:

a sensor device, wherein the sensor device detects an object approaching one of the plurality of rotor blades and wherein the sensor determines a position of the object relative to the one of the plurality of rotor blades and a speed of the object;

a control device connected in a signal-transmitting manner to the sensor device, wherein the control device receives the position and the speed of the object from the sensor device and uses the position and the speed of the object to extrapolate a trajectory of the object, and wherein the control device adjusts an angular position or a rotational speed of the rotor using the electro mechanical transducer to avoid a collision between the object and the one of the plurality of rotor blades; and a braking device, wherein the control device uses the braking device to decelerate the rotational speed of the rotor to avoid a collision between the object and one of the plurality of rotor blades, wherein the braking device is capable of stopping the rotor within less than two rotations of the rotor and wherein the braking device comprises an annular surface arranged at an outer circumference of the rotor and a brake shoe cooperating therewith.

2. A ventilator having a rotor operatively connected to an electro mechanical transducer, wherein the rotor is rotatably mounted around an axis of rotation, wherein the rotor includes a plurality of rotor blades arranged around the axis of rotation, the ventilator comprising:

a sensor device, wherein the sensor device detects an object approaching one of the plurality of rotor blades and wherein the sensor determines a position of the object relative to the one of the plurality of rotor blades and a speed of the object;

a control device connected in a signal-transmitting manner to the sensor device, wherein the control device receives the position and the speed of the object from the sensor device and uses the position and the speed of the object to extrapolate a trajectory of the object, and wherein the control device adjusts an angular position or a rotational speed of the rotor using the electro mechanical transducer to avoid a collision between the object and the one of the plurality of rotor blades; and a pyrotechnically inflatable catch cushion, wherein the control device deploys the pyrotechnically inflatable catch cushion to stop the rotor before one of the plurality of rotor blades collides with the object.

3. The ventilator according to claim 2, wherein the pyrotechnically inflatable catch cushion extends around a portion of an outer circumference of the ventilator when deployed.

4. The ventilator according to claim 2, wherein the pyrotechnically inflatable catch cushion partially covers the rotor in the axial direction to form a barrier between the object and the rotor.

5. The ventilator according to claim 1, further comprising a mechanical stopping device that enters into a trajectory of the one of the plurality of rotor blades to abruptly stop the rotor from rotating.

6. The ventilator according to claim 1, wherein the control device increases a speed of the electro mechanical transducer to prevent the object from colliding with one of the plurality of rotor blades.

7. The ventilator according to claim 1, wherein the sensor device comprises a first sensor and a second sensor, wherein the first sensor detects a first measured variable and the second sensor detects a second measured variable that differs from the first measured variable, and wherein the first and second sensors comprise an infrared sensor, an infrared camera, an ultrasonic sensor, a lidar sensor, a radar sensor, or a camera operating under visible light.

8. The ventilator according to claim 7, wherein the first sensor detects the position of the object relative to the one of the plurality of rotor blades and the second sensor detects the speed of the object.

9. A process for controlling a ventilator including a rotor having a plurality of rotor blades and a sensor device, wherein the process comprises the steps of:

detecting an object approaching one of the plurality of rotor blades;

determining a position of the object relative to the one of the plurality of rotor blades;

determining a speed of the object;

using the position and the speed of the object to extrapolate a trajectory of the object relative to the one of the plurality of rotor blades; and adjusting a rotational speed of the rotor to prevent the object from colliding with the one of the plurality of rotor blades, wherein the rotational speed of the rotor is adjusted using an actuator that actuates a brake shoe to stop the rotor.

10. The process according to claim 9, further comprising the step of unfolding a pyrotechnically inflatable catch cushion to stop or cover the one of the plurality of rotor blades.

11. The ventilator according to claim 2, further comprising a mechanical stopping device that enters into a trajectory of the one of the plurality of rotor blades to abruptly stop the rotor from rotating.

12. The ventilator according to claim 2, wherein the control device increases a speed of the electro mechanical transducer to prevent the object from colliding with one of the plurality of rotor blades.

13. The ventilator according to claim 2, wherein the sensor device comprises a first sensor and a second sensor, wherein the first sensor detects a first measured variable and the second sensor detects a second measured variable that differs from the first measured variable, and wherein the first and second sensors comprise an infrared sensor, an infrared camera, an ultrasonic sensor, a lidar sensor, a radar sensor, or a camera operating under visible light.

14. The ventilator according to claim 13, wherein the first sensor detects the position of the object relative to the one of the plurality of rotor blades and the second sensor detects the speed of the object.

\* \* \* \* \*